July 11, 1967  E. HERTER  3,330,914
SIGNALLING SYSTEMS
Filed Jan. 21, 1964  3 Sheets-Sheet 1

| | +U | -U | |
|---|---|---|---|
| 1 | — | a |  |
| 2 | — | a+b (R) |  |
| 3 | — | a(R)+b |  |
| 4 | b | a |  |
| 5 | b | a+b (R) |  |
| 6 | b | a(R)+b |  |
| 7 | a+b (R) | a |  |
| 8 | a+b (R) | a+b (R) |  |
| 9 | a+b (R) | a(R)+b |  |
| 10 | a(R)+b | a |  |
| 11 | a(R)+b | a+b (R) |  |
| 12 | a(R)+b | a(R)+b |  |

INVENTOR
E. HERTER

BY
ATTORNEY

INVENTOR
E. HERTER

BY
ATTORNEY

United States Patent Office 3,330,914
Patented July 11, 1967

3,330,914
SIGNALLING SYSTEMS
Eberhard Herter, Stuttgart, Germany, assignor to International Standard Electric Corporation, New York, N.Y., a corporation of Delaware
Filed Jan. 21, 1964, Ser. No. 339,230
Claims priority, application Germany, Jan. 31, 1963, St 20,241
7 Claims. (Cl. 179—86)

ABSTRACT OF THE DISCLOSURE

Direct current key dialling system. An increased current drop is used to signal the beginning of signalling. Code signals are derived when first positive then negative potential is applied to the keyed system. Resistance ground and ground combinations form the code.

The invention relates in general to D.C. signalling systems and more particularly, to systems that use asymmetrical D.C. signalling over two-wires for the transmission of dial codes in key-dialling. The code signals formed asymmetrically at a subscriber station are evaluated at the exchange in two interrogating steps, each using a different current direction.

A problem in such D.C. key-dialling systems is the proper recognition of the key-dialling criterion on the receive end. Signalling methods known use loop interruption on the transmitting end as a key-dialling criterion. The criterion is evaluated on the receiving end and an interrogation is thereupon initiated. The loop interruption key-dialling criterion is registered in the receiving facility as a current drop in one wire. Thus, the criterion may be falsely recognized when applying ground to said wire, although the loop is not interrupted at all. This causes, at least for the first interrogating step, wrong evaluations of the signals applied. If the signal code provides in the first interrogating direction only the grounding of one wire it leads to the registration of the code element: "Both wires ground."

To avoid this drawback another known signalling system provides resistors in the signalling circuit at the transmitting or calling end so that the evaluating device for the key-dialling criterion does not respond when ground is applied to the wires. This guarantees that normally the evaluation is initiated only when the loop opens. However in these systems, if interferring voltages occur on the line, the susceptibility to trouble in signalling is increased due to the subdivision of the current range on both wires.

Therefore, asymmetrical D.C. signalling systems were used which furnished, without reducing the asymmetrical signalling currents, a clear key-dialling criterion. Such systems are characterized in that pushbutton recognition and starting signal recognition are provided. The recognition of pushbutton actuation is achieved by the current drop in one wire, while the voltages wire-to-ground and wire-to-wire, effect a coincidence circuit which furnishes the starting signal for the evaluation of the criterion if one or several signalling conditions are left off due to the resting position of the signalling. In this system no erroneous dialling due to varying closing periods of contacts is possible and nevertheless, ground can be applied at the transmitting end without any resistor, so that higher interferring voltages can be admitted without disturbing the signalling.

All the aforementioned signalling systems use the criterion "loop interruption" at the transmitting end in order to initiate the signalling. This has a drawback that, when the call has been established, an erroneous pushbutton pressure leads to the release of said call. The dial pulse receiving device which could distinguish the erroneous pushbutton pressure from the call release signal is not connected with the line at that moment. The supply set must be provided with additional switching means to make this recognition.

The systems provided with separation of pushbutton recognition and starting signal for the evaluation recognition however, has another drawback. At a semi-pressed button the pushbutton recognition's criterion can already be evaluated the starting signal, however, does not arrive. If the supply set is only equipped with a device to recognize the pushbutton recognition the central dial pulse receiving device is seized without use until the starting signal for the evaluation arrives. To avoid this, expensive pushbutton sets with toggle keys have to be provided on the transmitting end or the sets must be equipped with the devices to receive the starting signal for the evaluation. Both possibilities would essentially increase the costs for the signalling method.

An object of this invention is to provide a new and novel D.C. signalling system that avoids all the draw backs of the known systems. A more particular object is to create asymmetrical D.C. signalling systems, particularly for key-dialling, which render a clear criterion with which evaluation can commence at once. The signalling system according to one aspect of the invention is characterized in this that each signal is initiated by a current drop in one wire. After receiving the starting signal the interrogating voltages are applied. During the generation of the signals, both wires are decoupled via a resistor inserted in the loop. Different current directions are used. Since during signalling, the loop is not reconnected, an erroneous pushbutton pressure cannot release an established connection. Also, only a single criterion "current drop in one wire" is used which is released only at a completely pressed down button, therefore, no erroneous or wrong dialling during the keying can occur. The termination period of the centralized dial pulse receiving device is reduced, because the keying criterion is switched off when the pushbutton pressure is completed. The code elements must be selected according to the invention in that the control or checking device, corresponding to the second interrogating direction grounds always one or both wires directly.

By inserting an additional resistor into one or the other wire the code element "both wires grounded" can be used twice. This resistor should not be confused with the series resistor of the known signalling methods wherein a resistor is provided to obtain a subdivision of the signalling current ranges. The value of the additional resistor can be kept small, its limitation is that it must be of a size such that the currents of both wires or the voltages wires against ground, can be readily discerned. In the first interrogating direction, which is of the opposite polarity compared to the checking device and the second interrogating direction, the code elements "no wire grounded," "b-wire grounded," and "both wires grounded" can be used. In this interrogating direction, too, the code element "both wires grounded" can be used twice by means of the additional resistor in order to make use of the different polarity of the voltage "wire-to-wire" on the receiving end.

The invention is now explained in detail with the aid of the accompanying drawings, wherein.

Figure 1:
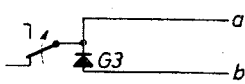
FIG. 1 shows the signalling code for twelve different characters, according to the invention.
Figure 1:
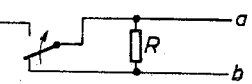
Figure 1:
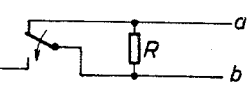
Figure 1:
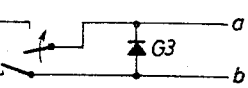
Figure 1:
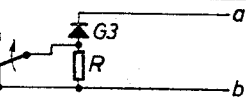
Figure 1:
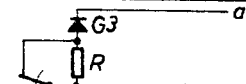
Figure 1:
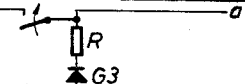
Figure 1:
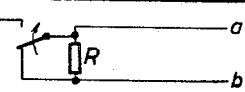
Figure 1:
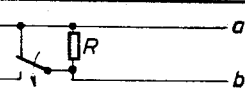
Figure 1:
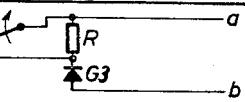
Figure 1:
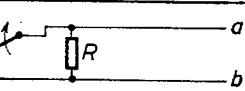
Figure 1:

FIG. 1 shows the signal code for a signalling system according to the invention in form of a table. In the first column the signal or character combinations are listed. The second and third columns show the code elements on the transmitting end. The interrogating voltages +U and −U indicate which polarity is applied to the wires. Both interrogating voltages are grounded at one side. The line is checked for signals with a voltage −U at the a-wire whereas the b-wire shows ground potential. The interrogating condition wherein the voltage −U on one wire, the other wire is grounded, and the current in the b-wire is switched off is evaluated as the key-dialling criterion. The switching means at the b-wire in the current supply set needs to discern between normal supply current and leakage current.

Interrogation of the transmitting end is initiated responsive to the evaluation of this key-dialling criterion. This evaluation can be achieved, for example, in that a centralized dial pulse receiving device is requested. Interrogation is made in two steps, at first with the interrogating voltage +U and thereafter with the interrogating voltage −U. In the fourth column a block diagram of the transmitting end shows how the code element signals are formed.

For example, line 4 (for the signal "4") shows the two code elements "b-wire grounded" for the interrogating voltage +U and "a-wire grounded" for the interrogating voltage −U. Two contacts and the transmitting end are necessary to realize this signal combination. The contact showing an arrow is closed when the key or pushbutton is operated. The rectifier G2 is connected to the b-wire via a contact. In the direction of checking rectifier G3 is blocked, so that the current in the b-wire flows with full intensity. The other contact connects the rectifier G1 with the a-wire. For the checking direction the rectifier G1 is conductive so that the a-wire is grounded at the transmitting end. This negative potential blocks rectifier G2 to cause the current in the b-wire to be completely switched off and, consequently, initiates the interrogation. In the first interrogating direction with the grounded voltage +U the only circuit completed is via the b-wire. In the second interrogating direction with the grounded voltage −U the only circuit completed is via the a-wire. This signal combination is perceived through corresponding switching means of the dial pulse receiving device as will be described later.

Another deviation of the signal code may be understood from line 10. The code element "a-, and b-wire grounded" can be used twice by inserting the resistor R into the circuit of the a- or b-wire. As the term $a(R)+b$ in the first column indicates the a-wire is grounded via the resistor R, the b-wire, however, is grounded directly. In the interrogating direction −U only the a-wire is grounded, as may be understood from column 3. If the contact which connects the rectifier G2 closes first the current flowing in the b-wire does not change, If the rectifier G1 is switched on, the current in the b-wire is switched off. The interrogation with the voltage +U renders a closed signalling circuit via the a-wire as well as via the b-wire. The a-wire is grounded via the resistor R and the rectifier G2, whereas the b-wire is directly grounded via the rectifiers G3 and G2. The resistor R is of such a size that the voltage drop is larger than the sum of the voltage drops at both rectifiers G3 and G2. It is thereby assured that the voltage drop a-wire to ground is larger than the voltage drop b-wire to ground. This voltage difference can be evaluated in a simple manner by determining the polarity of the voltage "wire against wire."

Figure 2:
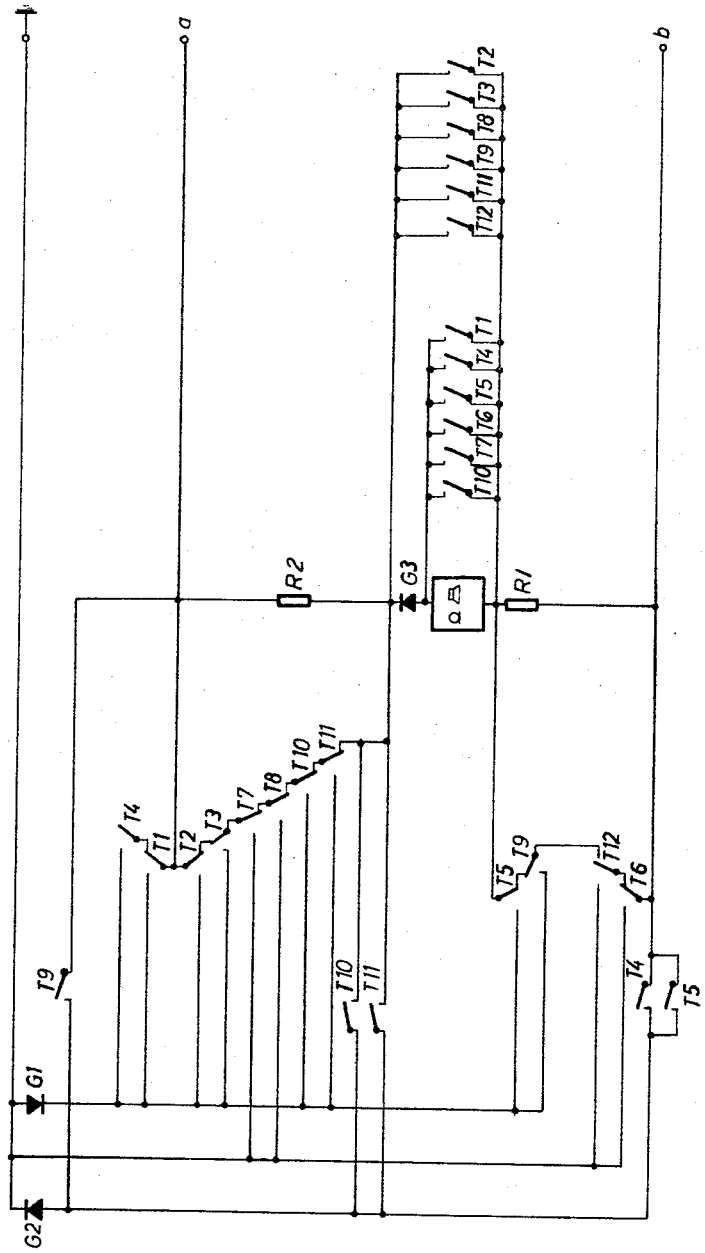
FIG. 2 shows the transmitting end, e.g., a telephone subscriber set.

FIG. 2 shows a telephone set circuitry for this signalling code. The contacts of the pushbutton set are arranged such that each pushbutton has no more than two make-contacts and one switch-over contact. The switch-over contact is operated when the pushbutton is pressed and is located in that circuit which initiates the current drop in the b-wire. The telephone set circuit with speech transformer etc. is shunted at each pushbutton operation. A resistor R is provided in both the a-wire and the b-wire. The resistor R of the a- and the b-wire are short-circuited by the chain of the break-contacts T2 . . . T11 and T5 . . . T6. Depending on which button has been pressed one or the other resistor is switched on. As FIG. 1 shows the resistor R is ineffective at the signals 3 and 4. This may also be gathered from FIG. 2, because the pushbutton contacts T1 and T4 are not included in the contact chain of the break-contacts.

Figure 3:
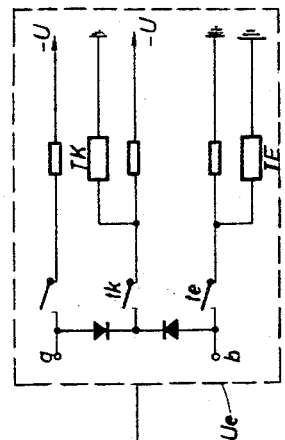
FIG. 3 shows the block diagram of transmitting and receiving end with facilities to receive the key-dialling criterion.

FIG. 3 shows the apparatus for signalling and receiving in key-dialling telephone systems. On the left side the telephone set S is shown which can be constructed for example, as represented in FIG. 2. When one of a plurality of subscriber lines represented by set S seizes the exchange office facilities the line is current-supplied from a supply Ue. Upon seizure the supply Ue applies −U voltage to the a-wire through the top contact and resistance grounds the b-wire through a normally closed contact te. A device, such as relay TE is connected to the b-wire through contact te. Responsive to the operation of any of the keys the subset circuit is bypassed and the b-wire is connected to the a-wire through diode G3, resistor R2. With the subset short circuited sufficient current flows to operate relay TE. The relay TE remains operated until the current in the b-wire is switched off. This device TE is connected during no-signalling condition, as indicated, through the contacts te.

Figure 4:
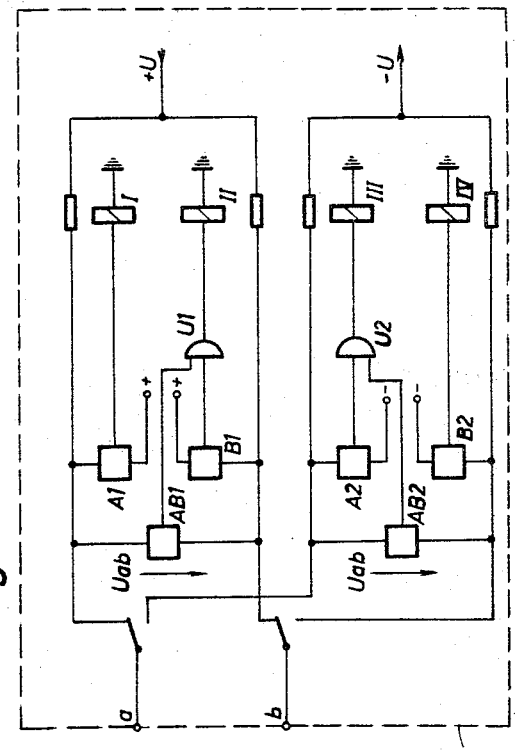
FIG. 4 shows the centralized dial pulse receiving device.

The device TE operates when a dialling key is pressed and contacts thereon, not shown, connect the dial pulse receiving device WA shown in FIG. 4 to the line. The voltage +U and −U are applied to both wires in two interrogating steps. The relays I . . . IV are provided to evaluate the code signals, viz. two for each interrogating direction. For example, if in the first interrogating step no wire at the transmitting end is grounded (signals 1 to 3) the relays I and II do not respond. If the b-wire is solely grounded the device B1 aligned to the b-wire operates. This device can be designed for example, as a difference amplifier which renders an output signal when ground is applied in the telephone set. The device AB1 valuates the polarity of the voltage Uab and furnishes an output signal, if this voltage is positive. This is the case, for example, if only the b-wire is grounded. Since the AND circuit U1 is controlled via both inputs the relay II operates. Relay I operates under the control of the difference amplifier A1, responsive to the code element "a-wire grounded and b-wire grounded via resistor R." Since the voltage Uab is then negative, the coincidence for the AND circuit U1 is missing so that relay II cannot operate. For the code element "a-wire grounded via resistor R and b-wire directly grounded" the condition for the device A1 is equal so that relay I again operates. Since the voltage Uab is positive here relay II can operate too.

Figure 5:
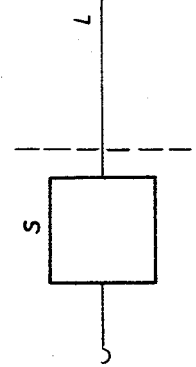
FIG. 5 shows the coding of the received signals via the receiver relays in the dial pulse receiving device.

The conditions are similar in the second interrogating step. The relays III and IV are provided to evaluate the signals. If ground potential is applied to the wire the facilities A2 and B2 operate. The facility A2 cooperates with the facility AB2 to evaluate the polarity of the voltage Uab on the AND circuit U2, which controls the relay III. The signal code may be gathered from FIG. 5. The effect is similar as described for the relays I and II of the interrogating direction with the voltage +U.

A device such as relay TK is provided in addition in the power supply Ue which supervises the end of the pushbutton pressure. In this case here it is sufficient to check the current flow in one wire.

While the principles of the invention have been described above in connection with specific apparatus and applications, it is to be understood that this description

I claim:

1. An asymmetrical D.C. signalling system comprising a plurality of subscriber stations each connected to a common central exchange over two wires, said subscriber stations comprising pushbutton transmitting means for interconnecting said two wires, means in said exchange for applying a potential to a first of said two wires, and grounding the second of said two wires so that current flows through said two wires as a starting signal, said exchange comprising starting signal receiving means operated responsive to said starting signal, code signal receiving means connected to said two wires acting responsive to the operation of said starting signal receiving means to successively apply a first and second oppositely polarized interrogating voltage to said two wires, rectifier means associated with said transmitting means in said subscriber station for coupling and decoupling said two wires responsive to the polarity of said interrogating voltage to form said selected code signal and means in said code signal receiving means for receiving and registering said selected code signal.

2. In the asymmetrical D.C. signalling system of claim 1 wherein said starting signal receiving means comprises means for detecting the release of said actuated pushbutton.

3. In the asymmetrical D.C. signalling system of claim 2 wherein said pushbutton means always ground at least one of said wires responsive to said second interrogating voltage.

4. In the asymmetrical D.C. signalling system of claim 3 wherein said transmitting means comprises resistance means connecting said two wires providing a resistance code.

5. In the asymmetrical D.C. signalling system of claim 4 wherein said pushbutton provides a code element "no wire grounded" responsive to said first interrogating direction.

6. In the asymmetrical D.C. signalling system of claim 5 wherein said code signal receiving means comprises means for evaluating the relative polarity of said two wires, differential amplifier means for determining when either of said two wires are grounded, gate means operated responsive to the coincidence of signals from said polarity evaluator means and said differential amplifier means, for operating said register means.

7. In the system of claim 6 wherein said differential amplifier means comprises four differential amplifiers with one coupled to each line for each applied interrogating voltage polarity wherein said gate means comprises an individual gate for each interrogating voltage polarity and wherein said register means comprises a plurality of relays assigned to each of said two interrogating voltage polarities, means for operating at least one relay responsive to the operation of said gate means and at least one relay responsive to the operation of said differential amplifier means for each polarity to discern said code elements.

References Cited

UNITED STATES PATENTS 2,400,148    5/1946    Hubbard _____ 179—90.3

KATHLEEN H. CLAFFY, *Primary Examiner.*

H. ZELLER, *Assistant Examiner.*